(12) United States Patent
Bayramian et al.

(10) Patent No.: US 11,904,547 B2
(45) Date of Patent: Feb. 20, 2024

(54) ADDITIVE MANUFACTURING SYSTEM USING A PULSE MODULATED LASER FOR TWO-DIMENSIONAL PRINTING

(71) Applicant: Seurat Technologies, Inc., Wilmington, MA (US)

(72) Inventors: Andrew J. Bayramian, Marblehead, MA (US); James A. DeMuth, Woburn, MA (US); Ning Duanmu, Nashua, NH (US); Yiyu Shen, Tewksbury, MA (US)

(73) Assignee: Seurat Technologies, Inc., Wilmington, MA (US)

( * ) Notice: Subject to any disclaimer, the term of this patent is extended or adjusted under 35 U.S.C. 154(b) by 0 days.

(21) Appl. No.: 17/988,515

(22) Filed: Nov. 16, 2022

(65) Prior Publication Data
US 2023/0085638 A1     Mar. 23, 2023

Related U.S. Application Data

(63) Continuation of application No. 16/720,542, filed on Dec. 19, 2019, now Pat. No. 11,541,481.
(Continued)

(51) Int. Cl.
*B23K 26/342* (2014.01)
*B33Y 10/00* (2015.01)
(Continued)

(52) U.S. Cl.
CPC ............ *B29C 64/273* (2017.08); *B22F 10/28* (2021.01); *B22F 10/32* (2021.01); *B22F 10/36* (2021.01);
(Continued)

(58) Field of Classification Search
CPC .. B23K 26/342; B23K 26/144; B23K 26/703; B23K 15/0013; B23K 15/0086; B23K 26/032; B23K 26/702; B23K 15/0006; B23K 15/002; B23K 15/0026; B23K 15/0093; B23K 15/06; B23K 2101/001; B23K 2101/008; B23K 2101/02; B23K 2101/24; B23K 2103/00; B23K 2103/42; B23K 2103/50; B23K 26/0006; B23K 26/03; B23K 26/0622; B23K 26/0643; B23K 26/066; B23K 26/082; B23K 26/083; B23K 26/0846; B23K 26/1224; B23K 26/123; B23K 26/127; B23K 26/142; B23K 26/16; B23K 26/36; B23K 26/704;
(Continued)

(56) References Cited

U.S. PATENT DOCUMENTS

| | | | |
|---|---|---|---|
| 2008/0181269 A1* | 7/2008 | Osako | B23K 26/0622 372/30 |
| 2013/0033742 A1* | 2/2013 | Rogers | H04B 10/2935 359/341.1 |

(Continued)

*Primary Examiner* — Chris Q Liu
(74) *Attorney, Agent, or Firm* — David R. Stevens; Stevens Law Group

(57) ABSTRACT

A method of additive manufacture is disclosed. The method may include providing a powder bed and directing a shaped laser beam pulse train consisting of one or more pulses and having a flux greater than 20 kW/cm² at a defined two dimensional region of the powder bed. This minimizes adverse laser plasma effects during the process of melting and fusing powder within the defined two dimensional region.

20 Claims, 6 Drawing Sheets

Related U.S. Application Data

(60) Provisional application No. 62/781,996, filed on Dec. 19, 2018.

(51) Int. Cl.

| | | |
|---|---|---|
| *B33Y 70/00* | (2020.01) | |
| *B23K 26/12* | (2014.01) | |
| *B23K 26/073* | (2006.01) | |
| *B23K 26/0622* | (2014.01) | |
| *B29C 64/273* | (2017.01) | |
| *B33Y 50/02* | (2015.01) | |
| *B23K 26/03* | (2006.01) | |
| *B23K 26/06* | (2014.01) | |
| *B23K 26/064* | (2014.01) | |
| *B22F 10/28* | (2021.01) | |
| *B22F 12/43* | (2021.01) | |
| *B22F 12/44* | (2021.01) | |
| *B22F 12/90* | (2021.01) | |
| *B22F 10/32* | (2021.01) | |
| *B22F 10/36* | (2021.01) | |
| *B22F 12/41* | (2021.01) | |
| *B22F 10/64* | (2021.01) | |

(52) U.S. Cl.
CPC ............ *B22F 12/43* (2021.01); *B22F 12/44* (2021.01); *B22F 12/90* (2021.01); *B23K 26/032* (2013.01); *B23K 26/064* (2015.10); *B23K 26/0622* (2015.10); *B23K 26/0626* (2013.01); *B23K 26/073* (2013.01); *B23K 26/125* (2013.01); *B23K 26/127* (2013.01); *B23K 26/342* (2015.10); *B33Y 10/00* (2014.12); *B33Y 50/02* (2014.12); *B33Y 70/00* (2014.12); *B22F 10/64* (2021.01); *B22F 12/41* (2021.01)

(58) Field of Classification Search
CPC ............ B23K 37/0408; B23K 37/0426; B23K 15/02; B23K 26/034; B23K 26/04; B23K 26/042; B33Y 10/00; B33Y 30/00; B33Y 50/02; B33Y 40/00; B33Y 70/00; B33Y 80/00; B33Y 99/00; B33Y 50/00; B29C 64/153; B29C 64/386; B29C 64/393; B29C 64/264; B29C 64/268; B29C 64/35; B29C 64/357; B29C 64/379; B29C 64/277; B29C 64/273; B29C 64/282; B29C 64/286; B29C 64/40
USPC .............................. 219/76.1, 76.14
See application file for complete search history.

(56) References Cited

U.S. PATENT DOCUMENTS

| | | | |
|---|---|---|---|
| 2015/0273631 A1* | 10/2015 | Kenney | B33Y 70/00 |
| | | | 219/76.1 |
| 2017/0120332 A1* | 5/2017 | DeMuth | B22F 12/38 |
| 2017/0232637 A1* | 8/2017 | DeMuth | B22F 12/45 |
| | | | 264/497 |
| 2017/0239719 A1* | 8/2017 | Buller | B23K 26/034 |
| 2017/0298194 A1* | 10/2017 | Farrugia | A01N 59/16 |
| 2017/0298232 A1* | 10/2017 | Farrugia | B33Y 70/10 |
| 2018/0010221 A1* | 1/2018 | Aswathanarayanaswamy | |
| | | | B23K 26/342 |

* cited by examiner

ADDITIVE MANUFACTURING SYSTEM USING A PULSE MODULATED LASER FOR TWO-DIMENSIONAL PRINTING

CROSS-REFERENCE TO RELATED PATENT APPLICATION

The application is a continuation of U.S. patent application Ser. No. 16/720,542, filed Dec. 19, 2019, which claims the priority benefit of U.S. Patent Application No. 62/781,996, filed on Dec. 19, 2018, both of which are incorporated by reference in their entirety

TECHNICAL FIELD

The present disclosure generally relates to additive manufacturing and, more particularly, to powder bed fusion additive manufacturing using a high flux laser with controllable pulse shape and timing for two-dimensional printing.

BACKGROUND

Traditional component machining often relies on removal of material by drilling, cutting, or grinding to form a part. In contrast, additive manufacturing, also referred to as three-dimensional (3D) printing, typically involves sequential layer-by-layer addition of material to build a part.

In one high throughput embodiment, two-dimensional regions or "tiles" can be melted from a metal or other material powder layer using a high flux laser beam. However, higher peak power in the optical train translates to increased risk of laser damage to optics.

Another problem with standard high flux pulse trains directed against powder is related to generation of plasma and drastic volume expansion of the plasma. When plasma sustains and expands its volume, shockwaves are created which serve to push away significant amount of powders around the printed (or laser irradiated) area into surrounding areas. Effectively, this chain reaction of laser beam irradiation, plasma generation, plasma sustaining and expansion, shockwave propagation, and powder movement reduces quality of the printing process.

This is a particular problem for high-power powder bed fusion based additive manufacturing systems. Typical conventional powder bed fusion additive manufacturing systems currently available use individual laser beam of about 300 W to 1000 W in power and 50 micrometer (50 um) to 100 um focused beam diameter. This translates to only about several MW/cm$^2$ of laser power flux (for example, a 1000 W circular laser beam with a focused diameter of 100 um has a flux of $[1000 \text{ W}/(\pi*(0.005 \text{ cm})\char`^2)]=12.74 \text{ MW/cm}^2$), which is sufficient to melt and boil the metal powder, but doesn't reach energy densities likely to generate and sustain plasma. Further, since the melt volume is small, any plasma caused effects are minor. Typically, droplets of metal splashes can be seen during the printing process in conventional systems, but there is little to no plasma initiated shockwave to push away powders around the printed area, causing a "Halo effect" that severely and negatively effects the printing process.

Improved processes and systems are needed to prevent unacceptable halo effects when using high power flux laser beam to quickly melt and solidify the powder layer within the printing area. A useful laser beams power flux for two-dimensional powder bed fusion based additive manufacturing systems can range from tens to hundreds of kW/cm$^2$ to even GW/cm$^2$ level in some scenarios. Unfortunately, in an argon environment, these levels of laser power flux are typically sufficient to generate and sustain plasma that pushes away powder particles to form unacceptable halos during manufacture.

Fortunately, both damage to optics and unwanted plasma generation can be reduced or mitigated by suitable pulse shaping and timing of high flux lasers.

SUMMARY

In one embodiment of a method of additive manufacture, a powder bed of metal, ceramic, polymeric, or other materials is provide. A shaped laser beam pulse train including one or more pulses and having a flux greater than 20 kW/cm$^2$ is directed at a defined two dimensional region or "tile" of the powder bed. This energy is sufficient for melting and fusing powder within the defined two dimensional region. System, laser, optical, and powder material parameters are set in some cases so that less than 10% by weight of powder particles are ejected into areas outside the defined two dimensional region, in other cases less than 20% by weight of powder particles are ejected into areas outside the defined two dimensional region, in other cases less than 40% by weight of powder particles are ejected into areas outside the defined two dimensional region, in other cases less than 80% by weight of powder particles are ejected into areas outside the defined two dimensional region, in other cases less than 90% by weight of powder particles are ejected into areas outside the defined two dimensional region, in other cases less than 95% by weight of powder particles are ejected into areas outside the defined two dimensional region, in other cases less than 99% by weight of powder particles are ejected into areas outside the defined two dimensional region.

In some embodiments, the shaped laser beam pulse train is provided by a system including an arbitrary pulsed laser source, at least one pre-amplifier, and at least one power amplifier. Laser flux can be set between 200 kW/cm$^2$ and 10 GW/cm$^2$, and the defined two dimensional region of the powder bed selected to be between 0.000025 cm$^2$ and 1,000 cm$^2$. In some embodiments, thickness of the powder layer on the powder bed is between at least one of 1-2000 μm range, a 25-250 μm range, and 50-100 μm range. The size of the powder used is <100,000 μm in diameter when using a pulsed laser intensity <10 GW/cm$^2$, and in selected embodiments the powder used is <500 um in diameter using a pulse intensity >20 kW/cm$^2$.

In another embodiment, dynamic adjustments to the system can be realized by providing a calibration step that includes adjusting at least one of the laser beam energy, pulse width, or area of the defined two dimensional region in response to detected area of a halo formed by a preliminary halo test. Pulse shape, number of pulses, or pulse peak power as a function of time can also be adjusted in response to detected area of a halo formed by a preliminary halo test. Typically, radius of the halo is set to be greater than 50 microns beyond the defined two dimensional region. In other embodiments the radius of halo is set to be greater than 10 microns beyond the defined two dimensional region. In other embodiments the radius of halo is set to be greater than 1 micron beyond the defined two dimensional region.

In one embodiment, the laser temporal pulse width is between 20 nanoseconds and 100 microseconds. A laser pulse train with number of pulses greater than or equal to one (1) can be utilized, and the laser pulse peak power can adjusted as a function of time.

In another embodiment a laser system for two-dimensional printing includes a laser pulse signal source and one or more pre-amplifier modules to receive and direct a laser beam toward an optical isolation device. One or more amplifier modules can be positioned to receive a laser beam from the optical isolation device and direct it toward a defined two dimensional region of the powder bed. The laser pulse signal source can provide at least one of a square wave, a ramp, or a pulse train and the optical isolation device can include at least one of a Pockels cell, a Faraday rotator, a Faraday isolator, an acousto-optic reflector, or a volume Bragg grating.

In another embodiment a laser control method includes the steps of directing a laser pulse signal source toward a pre-amplifier module and an optic modulator or isolation device to provide a first laser beam. The first laser beam can be directed toward an amplifier module to provide a shaped laser beam pulse train including one or more pulses and having a flux greater than 20 kW/cm2. Typically, the flux is between 200 kW/cm$^2$ and 10 GW/cm$^2$. A laser temporal pulse width can be set to range between 20 nanoseconds and 100 microseconds. A laser pulse train with number of pulses greater than one (1) can be utilized, and the laser pulse peak power can adjusted as a function of time. The shaped laser beam pulse train can be directed at a two-dimensional region sized between 0.000025 cm$^2$ and 1,000 cm$^2$.

In one embodiment the shaped laser beam pulse train can be directed at an additive manufacturing station. For example, the shaped laser beam pulse train can be directed at a defined two dimensional region of an additive manufacturing powder bed to melt and fuse metal or other powders within the defined two dimensional region.

In one embodiment, a method of additive manufacture includes providing an enclosure surrounding a powder bed and having an atmosphere including at least 50% inert gas, optionally at greater than atmospheric pressure. A laser beam having a flux greater than 20 kW/cm2 can be directed at a defined two dimensional region of the powder bed to melt and fuse powder within the defined two dimensional region.

In one embodiment a method of additive manufacture includes providing an enclosure surrounding a powder bed and having an atmosphere including at least 50% inert gas, optionally at less than atmospheric pressure. A laser beam having a flux greater than 20 kW/cm2 can be directed at a defined two dimensional region of the powder bed to melt and fuse powder within the defined two dimensional region.

In one embodiment, an atmosphere can contain at least one of Ar, He, Ne, Kr, Xe, CO2, N2, O2, SF6, CH4, CO, N2O, C2H2, C2H4, C2H6, C3H6, C3H8, i-C4H10, C4H10, 1-C4H8, cic-2,C4H7, 1,3-C4H6, 1,2-C4H6, C5H12, n-C5H12, i-C5H12, n-C6H14, C2H3Cl, C7H16, C8H18, C10H22, C11H24, C12H26, C13H28, C14H30, C15H32, C16H34, C6H6, C6H5-CH3, C8H10, C2H5OH, CH3OH, and iC4H8.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

Figure 1A:
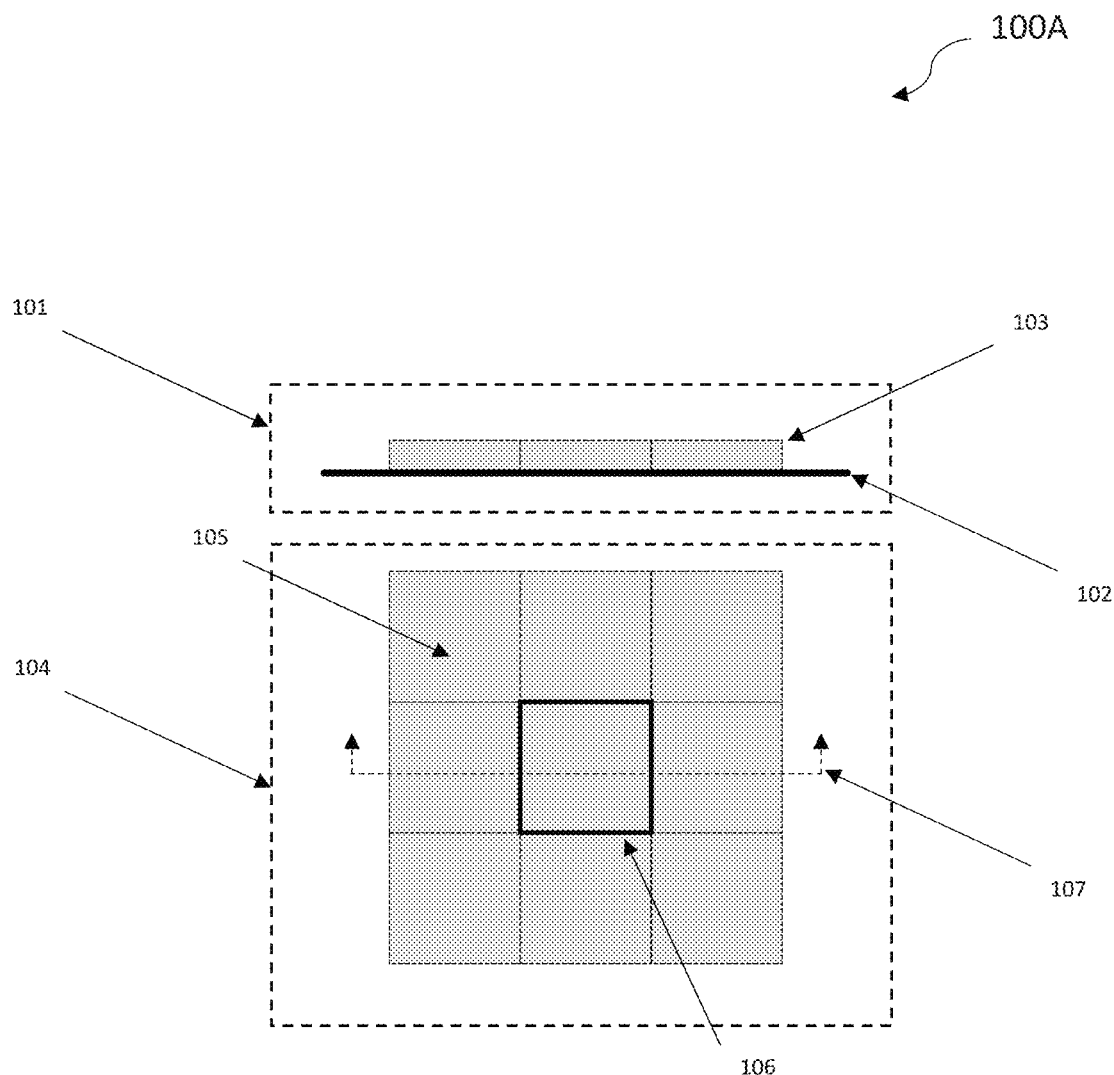
FIG. 1A illustrates a powder layer before response to laser.

In the following description, reference is made to the accompanying drawings that form a part thereof, and in which is shown by way of illustrating specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

An additive manufacturing system which has one or more energy sources, including in one embodiment, one or more laser or electron beams, are positioned to emit one or more energy beams. Beam shaping optics may receive the one or more energy beams from the energy source and form a single beam. An energy patterning unit receives or generates the single beam and transfers a two-dimensional pattern to the beam and may reject the unused energy not in the pattern. An image relay receives the two-dimensional patterned beam and focuses it as a two-dimensional image to a desired location on a height fixed or movable build platform (e.g. a powder bed). In certain embodiments, some or all of any rejected energy from the energy patterning unit is reused.

In some embodiments, multiple beams from the laser array(s) are combined using a beam homogenizer. This combined beam can be directed at an energy patterning unit that includes either a transmissive or reflective pixel addressable light valve. In one embodiment, the pixel addressable light valve includes both a liquid crystal module having a polarizing element and a light projection unit providing a two-dimensional input pattern. The two-dimensional image focused by the image relay can be sequentially directed toward multiple locations on a powder bed to build a 3D structure.

An energy source generates photon (light), electron, ion, or other suitable energy beams or fluxes capable of being directed, shaped, and patterned. Multiple energy sources can be used in combination. The energy source can include lasers, incandescent light, concentrated solar, other light sources, electron beams, or ion beams. Possible laser types include, but are not limited to: Gas Lasers, Chemical Lasers, Dye Lasers, Metal Vapor Lasers, Solid State Lasers (e.g. fiber), Semiconductor (e.g. diode) Lasers, Free electron laser, Gas dynamic laser, "Nickel-like" Samarium laser, Raman laser, or Nuclear pumped laser.

A Gas Laser can include lasers such as a Helium-neon laser, Argon laser, Krypton laser, Xenon ion laser, Nitrogen laser, Carbon dioxide laser, Carbon monoxide laser or Excimer laser.

A Chemical laser can include lasers such as a Hydrogen fluoride laser, Deuterium fluoride laser, COIL (Chemical oxygen-iodine laser), or Agil (All gas-phase iodine laser).

A Metal Vapor Laser can include lasers such as a Helium-cadmium (HeCd) metal-vapor laser, Helium-mercury (HeHg) metal-vapor laser, Helium-selenium (HeSe) metal-vapor laser, Helium-silver (HeAg) metal-vapor laser, Strontium Vapor Laser, Neon-copper (NeCu) metal-vapor laser, Copper vapor laser, Gold vapor laser, or Manganese (Mn/MnCl$_2$) vapor laser. Rubidium or other alkali metal vapor lasers can also be used. A Solid State Laser can include lasers such as a Ruby laser, Nd:YAG laser, NdCrYAG laser, Er:YAG laser, Neodymium YLF (Nd:YLF) solid-state laser, Neodymium doped Yttrium orthovanadate(Nd:YVO$_4$) laser, Neodymium doped yttrium calcium oxoborateNd:YCa$_4$O(BO$_3$)$^3$ or simply Nd:YCOB, Neodymium glass(Nd:Glass) laser, Titanium sapphire(Ti:sapphire) laser, Thulium YAG (Tm:YAG) laser, Ytterbium YAG (Yb:YAG) laser, Ytterbium:2O$_3$ (glass or ceramics) laser, Ytterbium doped glass laser (rod, plate/chip, and fiber), Holmium YAG (Ho:YAG) laser, Chromium ZnSe (Cr:ZnSe) laser, Cerium doped lithium strontium (or calcium)aluminum fluoride(Ce:LiSAF, Ce:LiCAF), Promethium 147 doped phosphate glass (147Pm$^{+3}$:Glass) solid-state laser, Chromium doped chrysoberyl (alexandrite) laser, Erbium doped anderbium-ytterbium co-doped glass lasers, Trivalent uranium doped calcium fluoride (U:CaF$_2$) solid-state laser, Divalent samarium doped calcium fluoride(Sm:CaF$_2$) laser, or F-Center laser.

A Semiconductor Laser can include laser medium types such as GaN, InGaN, AlGaInP, AlGaAs, InGaAsP, GaInP, InGaAs, InGaAsO, GaInAsSb, lead salt, Vertical cavity surface emitting laser (VCSEL), Quantum cascade laser, Hybrid silicon laser, or combinations thereof.

For example, in one embodiment a single Nd:YAG q-switched laser can be used in conjunction with multiple semiconductor lasers. In another embodiment, an electron beam can be used in conjunction with an ultraviolet semiconductor laser array. In still other embodiments, a two-dimensional array of lasers can be used. In some embodiments with multiple energy sources, pre-patterning of an energy beam can be done by selectively activating and deactivating energy sources.

The laser beam can be shaped by a great variety of imaging optics to combine, focus, diverge, reflect, refract, homogenize, adjust intensity, adjust frequency, or otherwise shape and direct one or more laser beams received from a laser beam source toward the energy patterning unit. In one embodiment, multiple light beams, each having a distinct light wavelength, can be combined using wavelength selective mirrors (e.g. dichroics) or diffractive elements. In other embodiments, multiple beams can be homogenized or combined using multifaceted mirrors, microlenses, and refractive or diffractive optical elements.

Energy patterning can include static or dynamic energy patterning elements. For example, photon, electron, or ion beams can be blocked by masks with fixed or movable elements. To increase flexibility and ease of image patterning, pixel addressable masking, image generation, or transmission can be used. In some embodiments, the energy patterning unit includes addressable light valves, alone or in conjunction with other patterning mechanisms to provide patterning. The light valves can be transmissive, reflective, or use a combination of transmissive and reflective elements. Patterns can be dynamically modified using electrical or optical addressing. In one embodiment, a transmissive optically addressed light valve acts to rotate polarization of light passing through the valve, with optically addressed pixels forming patterns defined by a light projection source. In another embodiment, a reflective optically addressed light valve includes a write beam for modifying polarization of a read beam. In yet another embodiment, an electron patterning device receives an address pattern from an electrical or photon stimulation source and generates a patterned emission of electrons.

A rejected energy handling unit can be is used to disperse, redirect, or utilize energy not patterned and passed through the energy pattern image relay. In one embodiment, the rejected energy handling unit can include passive or active cooling elements that remove heat from the energy patterning unit. In other embodiments, the rejected energy handling unit can include a "beam dump" to absorb and convert to heat any beam energy not used in defining the energy pattern. In still other embodiments, rejected beam energy can be recycled using beam shaping optics. Alternatively, or in addition, rejected beam energy can be directed to the article processing unit for heating or further patterning. In certain embodiments, rejected beam energy can be directed to additional energy patterning systems or article processing units.

An image relay receives a patterned image (typically two-dimensional) from the energy patterning unit and guides it toward the article processing unit 10. In a manner similar to beam shaping optics, the image relay can include optics to combine, focus, diverge, reflect, refract, adjust intensity, adjust frequency, or otherwise shape and direct the patterned image.

An article processing unit can include a walled chamber and bed, and a material dispenser for distributing material. The material dispenser can distribute, remove, mix, provide gradations or changes in material type or particle size, or adjust layer thickness of material. The material can include metal, ceramic, glass, polymeric powders, other melt-able material capable of undergoing a thermally induced phase change from solid to liquid and back again, or combinations thereof. The material can further include composites of melt-able material and non-melt-able material where either or both components can be selectively targeted by the imaging relay system to melt the component that is melt-able, while either leaving along the non-melt-able material or causing it to undergo a vaporizing/destroying/combusting or otherwise destructive process. In certain embodiments, slurries, sprays, coatings, wires, strips, or sheets of materials can be used. Unwanted material can be removed for disposable or recycling by use of blowers, vacuum systems, sweeping, vibrating, shaking, tipping, or inversion of the bed.

In addition to material handling components, the article processing unit can include components for holding and supporting 3D structures, mechanisms for heating or cooling the chamber, auxiliary or supporting optics, and sensors and control mechanisms for monitoring or adjusting material or environmental conditions. The article processing unit can, in whole or in part, support a vacuum or inert gas atmosphere to reduce unwanted chemical interactions as well as to mitigate the risks of fire or explosion (especially with reactive metals).

A control processor can be connected to control any components of additive manufacturing system. The control processor can be connected to variety of sensors, actuators, heating or cooling systems, monitors, and controllers to coordinate operation. A wide range of sensors, including imagers, light intensity monitors, thermal, pressure, or gas sensors can be used to provide information used in control or monitoring. The control processor can be a single central controller, or alternatively, can include one or more independent control systems. The controller processor is provided with an interface to allow input of manufacturing instructions. Use of a wide range of sensors allows various feedback control mechanisms that improve quality, manufacturing throughput, and energy efficiency.

Design, implementation and methods of operation of a laser system with long pulse agility and scalability to reduce damage to optics and minimize laser plasma induced "Halo" effects in the print bed are described. Since both effects are proportional to the peak intensity of the laser source, high power laser sources having a power flux of 20 kilowatts per square centimeter to more than a gigawatt per square centimeter at a use point (e.g. the print plane) are particularly susceptible to optics damage and laser induced plasma effects. In some embodiments, plasma related halo effects may be initiated from evolved vapor/particulates which are formed from ablated/evaporated material from the powder (Fe, Cr, Al, Co, Ti, Si, etc . . . ), in particular from metal components. This evolution of vapor/particulate material from the surface can happen at such high speeds due to laser heating the powder that a sufficient amount of material can enter the gas area above the area being printed, even while the laser is still firing. The evolved material can have an extremely high absorptivity of the laser light still incident on the tile being printed, and as such, it super-heats, generating a plasma which not only creates a blast wave and halo effect, but also begins to reflect and disperse any further incident laser energy. This rejection effect can lower the amount of energy that makes it to print bed and can negatively affect the quality of the printing process within the tile. High thermal conductivity of the process gas allows the gas to quickly conduct away the heat generated from the laser heating and melting process. High thermal conductivity therefore serves the purpose of extinguishing the plasma before plasma volume expansion sustains and therefore minimize the mechanical impact of the shockwave that pushes away the surrounding powders. High thermal conductivity of the process gas also serves to remove the heat from the powder layer's top surface, therefore reduces the vertical temperature gradient in the powder layer and allows more uniform heating and melting of the powder layer. As a result, the higher conductivity of the ideal process gas causes more heat to be transferred into the base (print plate or previous printed layer underneath the current layer) and therefor brings the base temperature up closer to the melting point without melting the top of the current powder layer. This creates beneficial thermal conditions to bond the powder layer to the base plate or previously printed layer underneath the current layer.

In some embodiments, use of an engineered gas forming an atmosphere in an enclosure acts to mitigate plasma generation and "Halo" issues. In some embodiments, predominantly inert gases including helium can enhance bonding and operation of powder bed fusion based additive manufacturing process within controlled temperature and pressure ranges.

In addition to engineering the species of gas, the operating conditions such as temperature can be used to further enhance the desired heat conduction or heat transfer coefficient away from the tile surface. For example, in the case of an engineered He gas at 1 bar, the thermal conductivity can double from ~0.15 to ~0.3 between 0 C and 600 C. Increasing the pressure in turn can also help this process by increasing the heat transfer coefficient and increasing the amount of energy required to move a blast wave. Enclosure atmospheric temperatures can be set between 20 degrees Kelvin (i.e. cryogenic) and 5000 degrees Kelvin. In some embodiments, the atmospheric temperature of the enclosure can be set between 200 and 600 degrees Celsius.

Adjustment to operating conditions such as pressure can be used to further enhance additive manufacture and reduce halo effects. Atmosphere in an enclosure can be maintained between 0 and 100 bar of absolute pressure. In some embodiments, the atmospheric temperature of the enclosure is below atmospheric pressure. In other embodiments, the atmospheric temperature of the enclosure is above atmospheric pressure. During the process of additive manufacturing, the laser interacts with the powdered material and the substrate, and the melted powder material begins to coalesce. This process has the potential to trap gas bubbles gaps in the material. By sufficiently reducing the pressure of the gas, these bubbles will begin to shrink, and eventually collapse on themselves, generating a higher density material during the melting process. In some cases, this process can occur at between 0.5 and 1.0 bar absolute pressure, in other instances it can occur at 0.25 and 1.0 bar of absolute pressure, in other instances it can occur at 0.1 and 1.0 bar of absolute pressure, in other instances it can occur at 0.01 and 1.0 bar of absolute pressure, in other instances it can occur at 0.001 and 1.0 bar of absolute pressure, in other instances it can occur at 0.0001 and 1.0 bar of absolute pressure, in other instances it can occur at 1E-6 and 1.0 bar of absolute pressure, in other instances it can occur at 1E-6 and 1E-3 bar of absolute pressure, in other instances it can occur at 1E-10 and 1.0 bar of absolute pressure.

Additionally, adjustments to operating conditions such as high pressure at various temperatures can be used to benefit the quality of parts after or during the additive process. Historically, the process of Hot Isostatic Pressing (HIP) is done after a part has been built from additive manufacturing, however there are considerable benefits to introducing it during the process. The HIP process can be operated between 500 and 1,000 bar, and 400 to 1500 C. However, it is not enough to simply operate the print process at high temperature and high pressure as the HIP process is based around compressing gas pockets of lower pressure. To this end, the pressure needs to be cycled at various stages of the print process. The print process would continue at low pressure, and then intermittently it would pause and pressure would be increased at elevated temperature to drive out pores and gas pockets.

In still other embodiments, other derivative or alternative methods can include recycle and recirculation of engineered process gas in-situ during the process, or introduction of an inert process gas environment only locally in the printing chamber where laser beam melting the metal powder happens.

Advantageously, using the described gas and operating conditions, plasma generation and volume expansion is suppressed or minimized during printing process. Powder movement and mechanical impact on the surrounding metal powders ("Halo") in response to laser beam melting and fusing is minimized and has insignificant impact on the continuation of aspects of an additive printing process (e.g. "Stitching" together adjacent tiles). Minimum generation and volume expansion of the plasma also can minimize the "blocking" or "scattering" effect of the plasma to the laser beam above the printing area.

High thermal conductivity of the engineered He containing process gas also helps to reduce the vertical temperature gradient across the depth of metal powder layer and therefore create more uniform heating and melting condition. It enables using high power flux laser(s) to quickly heat, melt, and solidify the metal powders for bonding with a base material.

FIG. 1A illustrates a powder layer system 100A in cross and top section before response to a laser. Cross-sectional view 101, taken from slice 107, shows a layer of powder 103 containing possible tiles to be printed, resting on a substrate 102. Top view 104 shows the view of the same grouping of tiles from above. In this example, there is powder in the region of a tile to be printed 106. The tile to be printed is surrounded by powder making up future potential tiles to be printed 105.

Figure 1B:
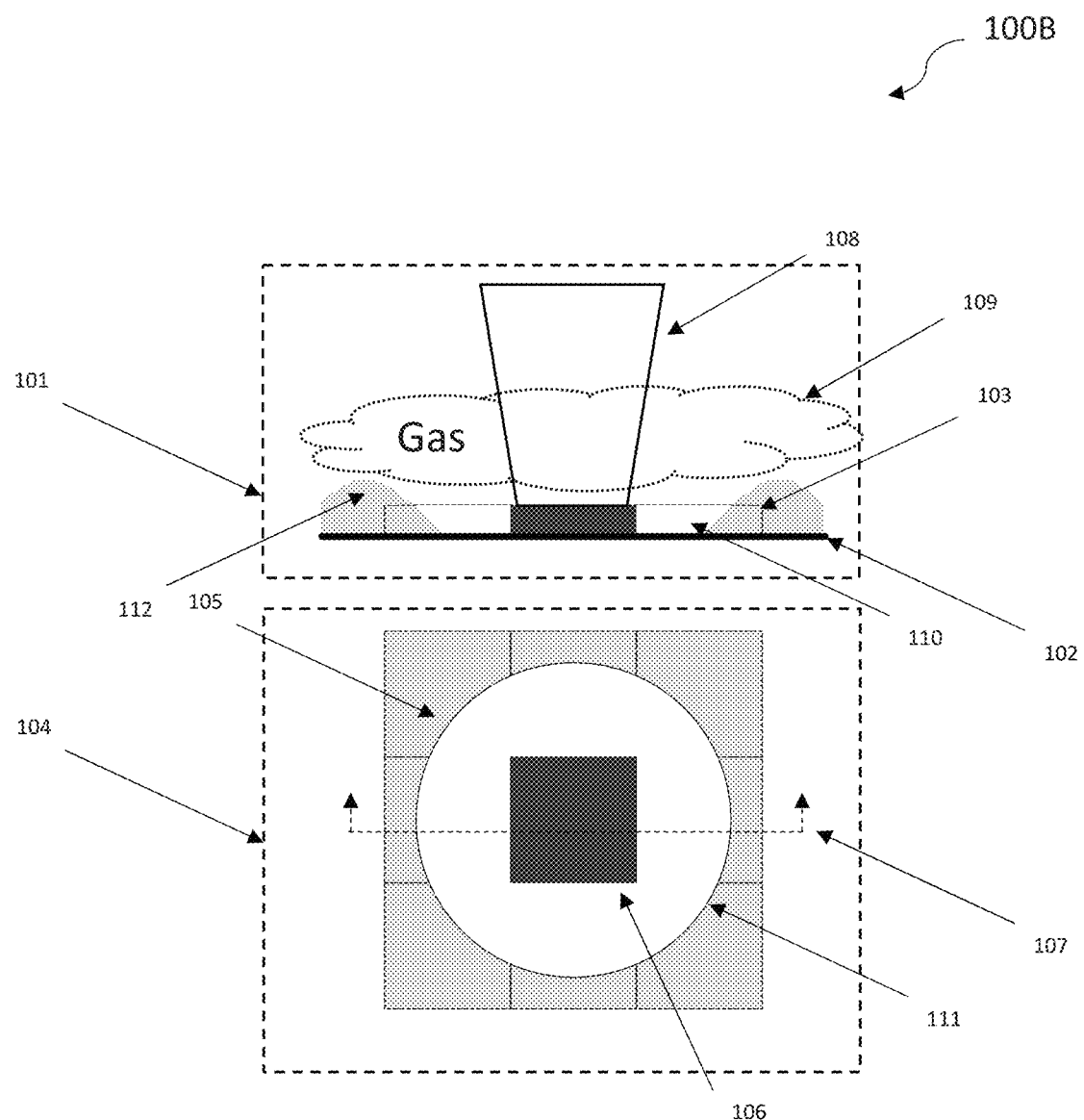
FIG. 1B illustrates powder movement in response to laser induced plasma.

FIG. 1B illustrates a powder layer system 100B in cross and top section responding to a laser beam having a flux greater than 20 megawatts per square centimeter and typically ranging between 100 megawatts and 10 gigawatts per square centimeter. At such power flux levels, significant amounts of laser induced plasma is formed at a use point. Cross-sectional view 101, taken from slice 107, shows a layer of powder 103 containing possible tiles to be printed, resting on a substrate 102. Top view 104 shows the view of the same grouping of tiles from above. In this example, there is a tile 106, which has been printed with laser 108. The printed tile is surrounded by powder making up future potential tiles to be printed 105. Vapor generated from the heating of the powder become super-heated by the laser 108, forming a gas 109 expansion wave which pushes powder formerly in a nice uniform layer 103, out of the "Halo" zone 110 next to printed tile 106. The movement of this powder causes further mounding on nearby tiles 112 which changes their layer thickness. The displacement of powder from the "Halo" zone 110 and mounding of powder in nearby tiles 112 cause problems for printing future layers.

Figure 1C:
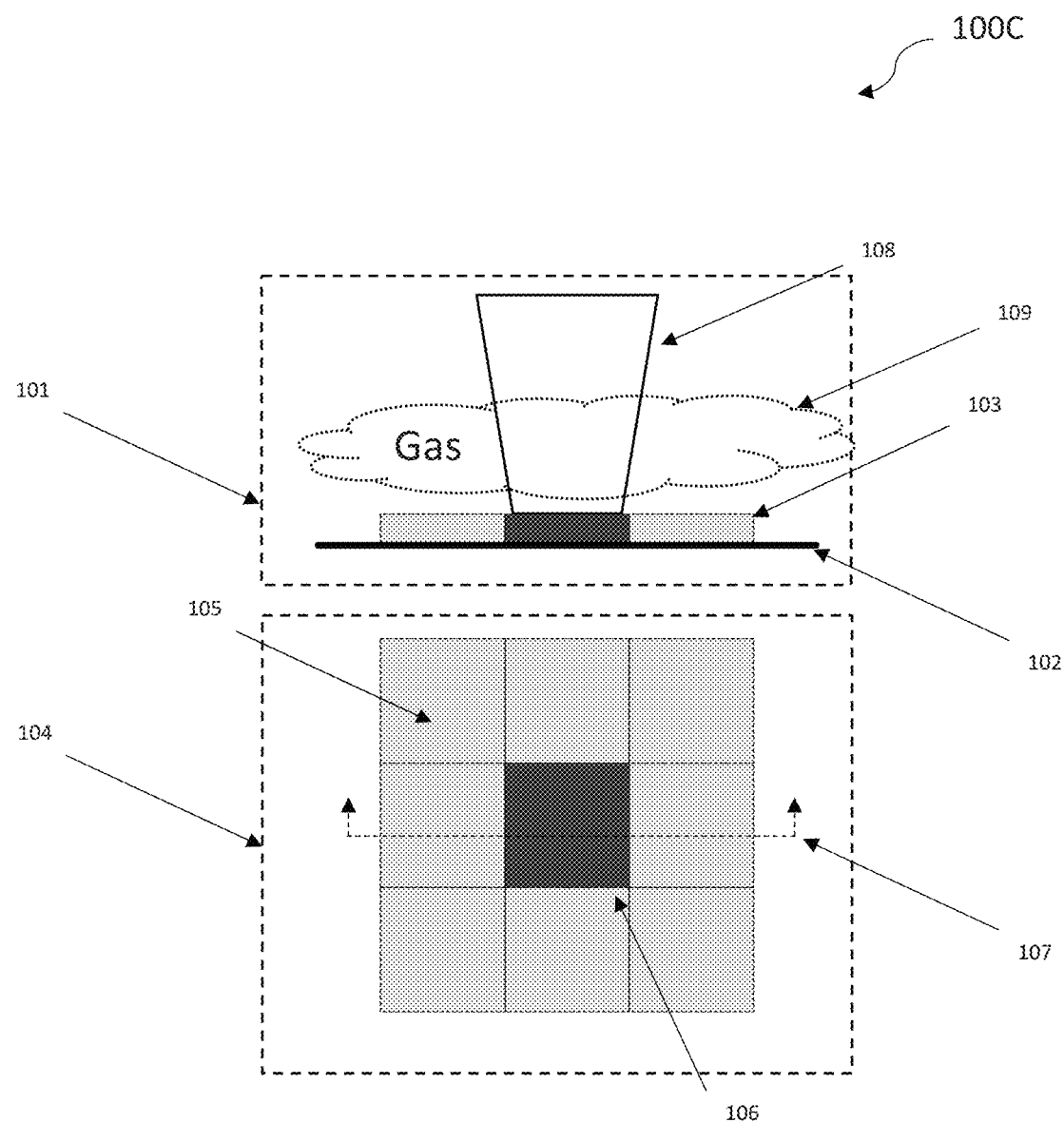
FIG. 1C illustrates powder movement in response to arbitrary pulse which prevents plasma formation.

FIG. 1C illustrates a powder layer system 100C in cross and top section in response to a laser beam having a flux greater than 20 megawatts per square centimeter and typically ranging between 100 megawatts and 10 gigawatts per square centimeter, under a predominantly helium containing atmosphere, and using various shaped laser pulse trains as described in more detail with respect to the following FIG. 3. Cross-sectional view 101, taken from slice 107, shows a layer of powder 103 containing possible tiles to be printed, resting on a substrate 102. Top view 104 shows the view of the same grouping of tiles from above. In this example, there is a tile 106, which has been printed with laser 108, in a predominantly Helium environment 109. The printed tile is surrounded by powder making up future potential tiles to be printed 105. Because the printing was carried out using shaped laser pulse trains, vapor generated from the heating of the powder does not become super-heated by the laser 108, the gas expansion wave which has the potential to push powder out of a formerly uniform layer 103 is mostly or completely eliminated, allowing for the powder 105 next to the printed tile 106 to be printed in future shots. Furthermore, powder layer 103 is not increased, preventing issues on future layers.

In selected embodiments, greater or lesser amounts of helium or other inert gases can be used to provide an atmospheric environment in an additive manufacturing enclosure. For example, Ar, He, Ne, Kr, Xe, CO2, N2, O2, SF6, CH4, CO, N2O, C2H2, C2H4, C2H6, C3H6, C3H8, i-C4H10, C4H10, 1-C4H8, cic-2,C4H7, 1,3-C4H6, 1,2-C4H6, C5H12, n-C5H12, i-C5H12, n-C6H14, C2H3Cl, C7H16, C8H18, C10H22, C11H24, C12H26, C13H28, C14H30, C15H32, C16H34, C6H6, C6H5-CH3, C8H10, C2H5OH, CH3OH, iC4H8 can be used. In some embodiments, refrigerants or large inert molecules (including but not limited to sulfur hexafluoride) can be used. An enclosure atmospheric composition to have at least about 1% He by volume (or number density), along with selected percentages of inert/non-reactive gasses can be used. In some embodiments, greater than 1% He can be used, while in other embodiments, greater than 10% He can be used, while in other embodiments, greater than 20% He can be used, while in other embodiments, greater than 40% He can be used, while in other embodiments, greater than 80% He can be used, while in other embodiments, 95% or greater He can be used. In addition to the composition of the engineered gas, ranges of the operating temperature and pressure of the engineered gas can also be selected to minimize plasma generation and improve printing quality. Complex molecules and large atomic weight gasses can have benefits related to having larger mass and taking much more force or energy to move. While larger molecules such as sulfur hexafluoride have a lower thermal conductivity than He (similar to Ar), the gas is much denser, and would act to push out other gasses (O2, H2O vapor, N2, etc . . . ) that are evolved from the powder during the printing process of heating it up to its melting temperature, and inducing a phase change. These lighter gasses would effectively float atop the much denser gas, and rapidly remove themselves from the process area. Additionally, more complex molecules have vibrational and rotational energy storage modes which noble gasses do not. These additional energy modes increase the specific heat of the gas at high temperatures and would help to reduce ionization potential of the gas by absorbing more energy from the surrounding metal vapor. Additionally, in the case of SF6 (sulfur hexafluoride) if the main inert gas molecule was to be broken up (either through plasma breakup, or through interaction with evolved radicals such as O, C, H, OH, various combinations, various combinations including species from the powder alloy, etc . . . ) the radicals formed from the breakup would help to scavenge evolved gas during the printing process (O, O2, H, OH, H2O, Fe, Cr, etc . . . ). Different gasses might be used for printing different materials by changing the atomic nature, density, or temperature of the gas.

Figure 2:
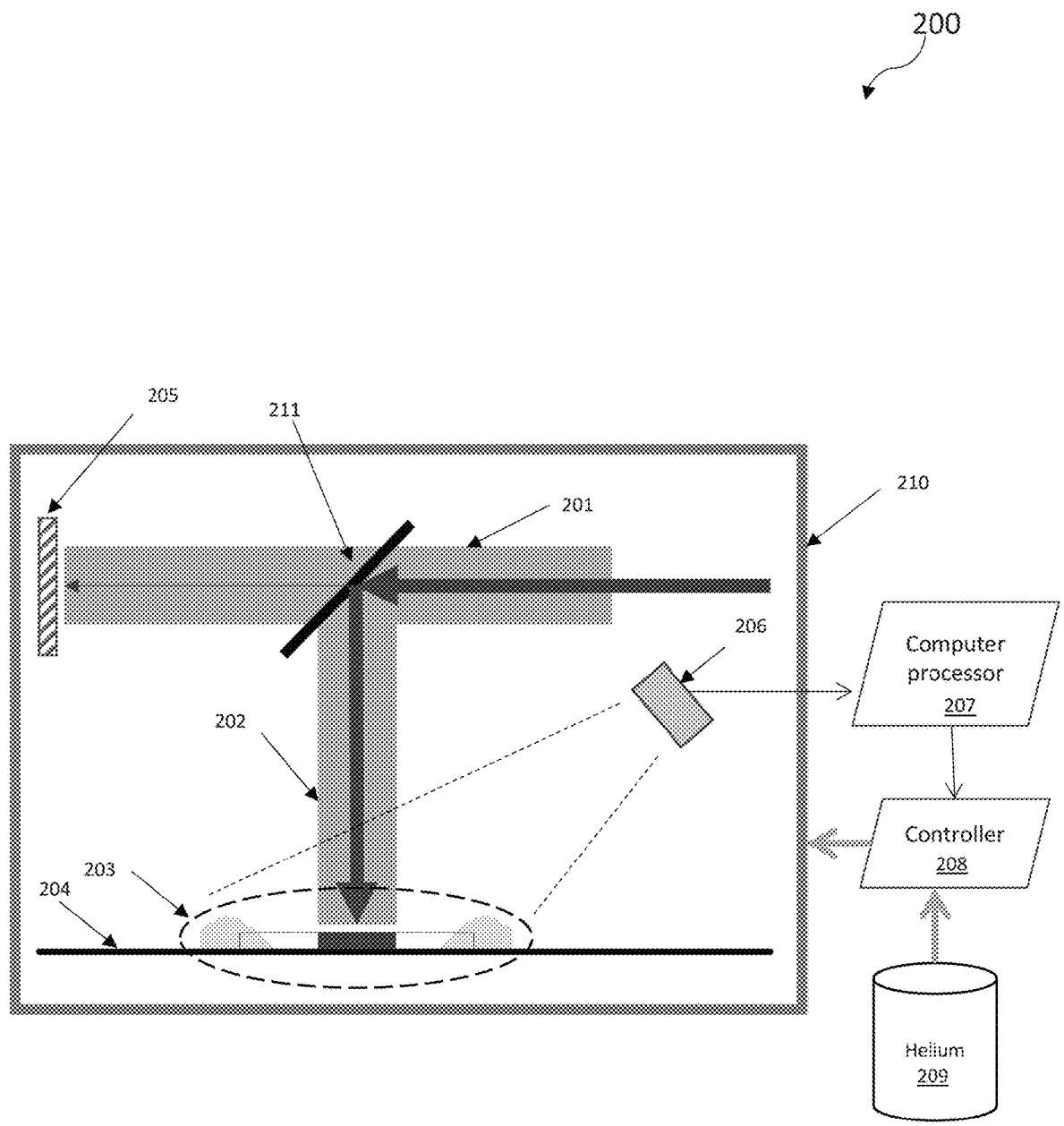
FIG. 2 illustrates an apparatus for two-dimensional additive manufacture with reduce plasma formation at high laser flux levels.

FIG. 2 illustrates a system 200 in which incoming laser beam 201 is directed to the powder bed by mirror 211 forming the printing laser beam 202. An insignificant part of the beam transmits through mirror 211, reaching the laser flux sensor 205 to detect laser flux. A vision system 206 is targeted at the printing area 203 on the base substrate 204. The image taken by the vision system 206 is transferred to a computer processor 207. The controller 208 utilizes the result of image processing to generate control signals to modulate shape, power, and format of the laser pulse. In one embodiment, the amount of helium supplied to the printing chamber 210 from the helium tank 209 can also be modulated, as well as adjustments to printing chamber atmospheric temperature.

Figure 3A:
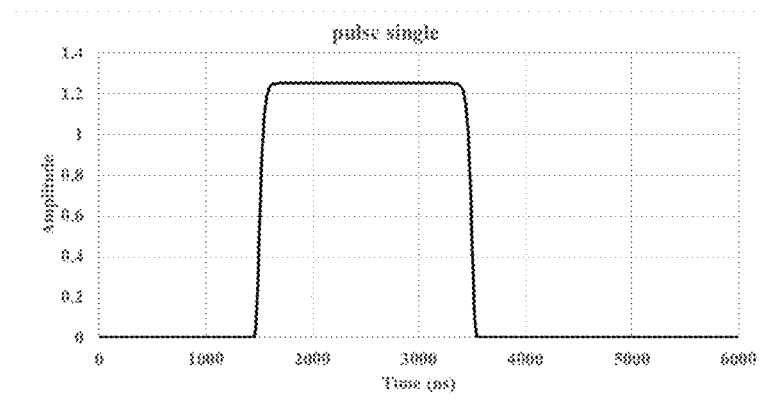
FIGS. 3A-C illustrates example pulse(s) for a high flux laser.
Figure 3B:
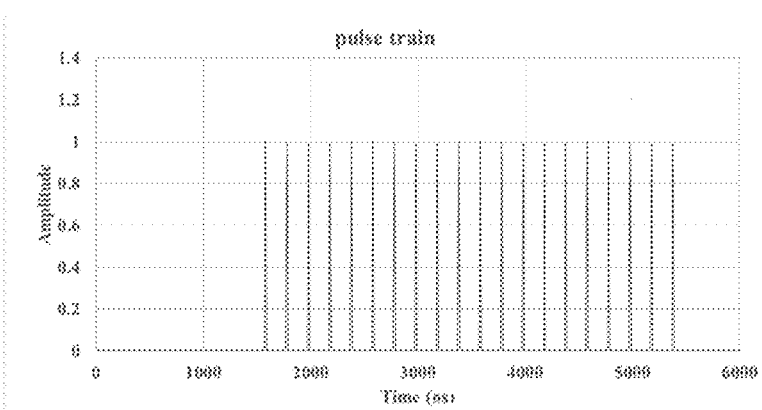
Figure 3C:
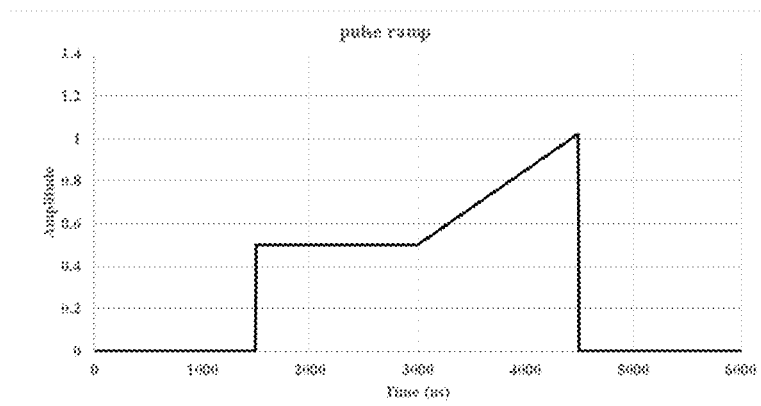

FIGS. 3A-C illustrate general types of output pulsed waveforms that could be used to eliminate or minimize laser plasma formation and its associated "Halo" effect on the print process. As seen with respect to graph 300A of FIG. 3A, a square pulse can be used, with a width and amplitude defined to be set below laser damage threshold requirements on laser system optics and below plasma thresholds which cause unwanted powder movement and halo formation.

FIG. 3B illustrates graph 300B having a shaped pulse train with similar energy content to that illustrated in FIG. 3A but delivered as a series of short pulses whose individual pulse width and pulse gap can be adjusted to reduce laser damage and powder movement. At laser flux levels of between 20 kW/cm² and 10 GW/cm² output, the pulse train will not typically use a simple oscillator (such as a mode locked oscillator), since such a system would have insufficient timing and pulse shape flexibility to reliably work without optic damage or inadvertent plasma creation. Feeding a simple pulse train into an amplifier system yields a spike shaped pulse train (i.e. the first pulses will be very high and trailing pulses low). This is due to saturation of the gain in the amplifiers, with the first pulses into a saturated amplifier stealing available energy.

FIG. 3C is a graph 300C showing a shaped pulse (or pulse train) which changes the amplitude of the laser peak power over time to improve overall performance while minimizing laser damage and reducing powder movement.

As will be understood, other improvements in system operation due to shaped laser pulse operation can include minimizing laser energy requirements and/or adjusting material properties of the printed parts.

In operation, pulse lengths can be tailored to bring the peak intensity down below optical damage thresholds for optics with limited capability.

Pulse lengths can be tailored to bring peak intensity at the powder bed below plasma formation limits, enabling improved two-dimensional tile printing.

Pulse length ranges can be tailored to specific materials which have different laser absorption, melting point, and heat of fusion to minimize laser plasma generation which prohibits efficient printing due to the "Halo" effect.

As a further example of improved operation, case 316 stainless steel powder (which has a melting point of 1371-1399 degrees Celsius) can be printed with >8 Joules per square centimeter at the print bed with pulse widths >200 nanoseconds in a helium environment at room temperature. Alternatively, aluminum powder (which has a lower melting point 659 degrees Celsius) will require less flux to print but due to its low density (light weight per powder particle), the halo effect will be emphasized. To reduce powder movement long pulse widths of >200 nanoseconds can be used. As another example, tungsten powder (with a very high melting point metal of 3399 degrees Celsius) will minimize plasma formation but will require a lot of energy to melt. In contrast, fused silica, a potential optical component has a very high melting point which will require a lot of laser flux but having a relatively low density will benefit from very long pulse lengths of >500 nanoseconds to avoid serious halo problems.

Pulse lengths can be tailored to improve the mechanical properties of a finished printed part by changing how the energy is delivered to the powder, and effectively controlling the temperature evolution and consequent stresses and/or crystallographic properties.

Figure 4:
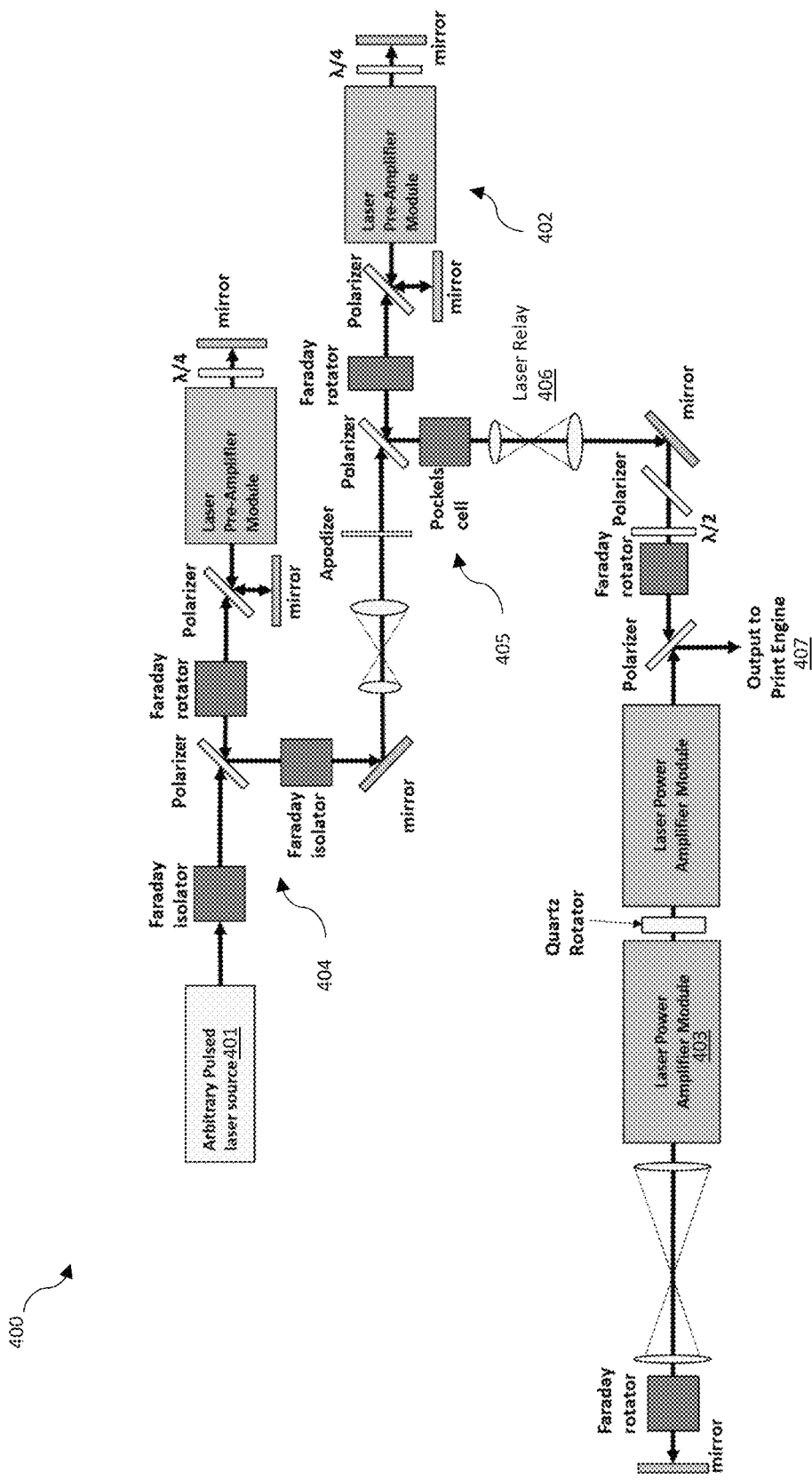
FIG. 4 illustrates modules of a system for providing a suitable pulse train.

FIG. 4 illustrates an example of a high flux laser system 400 with ability to create arbitrary and adaptable pulsed waveforms to minimize probability of laser damage, reduce or effectively eliminate laser plasma induced "Halo" in powder on a print bed, and adjust finished material properties of the additively manufactured parts. An arbitrary pulsed laser source 401 can be constructed from an arbitrary waveform generator coupled with a fiber coupled diode laser source. Laser pre-amplifiers 402 and power amplifiers 403 are used in multipass format for efficiency, with stored energy and size being adjustable to match system requirements. Faraday rotators 404, Faraday isolators and Pockels cells 405 are used to keep parasitic reflections from damaging low energy portions of the system and minimize lost energy to output pulse. A laser relay and imaging systems 406 are used to minimize laser spatial modulation and expand the beam shape as energy grows, helping avoid laser damage and allow for efficient extract of energy. Output of the laser system 407 can directed to the print engine, and ultimately to the powder bed.

The arbitrary pulsed laser source 401 includes a pulse electrical signal source such as an arbitrary waveform generator or equivalent acting on a continuous-laser-source such as a laser diode. In some embodiments this could also be accomplished via a fiber laser or fiber launched laser source which is then modulated by an acousto-optic or electro optic modulator. In some embodiments a high repetition rate pulsed source which uses a Pockels cell can be used to create an arbitrary length pulse train.

Various pre-amplifier modules 402 are used to provide high gain to the laser signal, while optical modulators and isolators can be distributed throughout the system to reduce or avoid optical damage, improve signal contrast, and prevent damage to lower energy portions of the system 400. Optical modulators and isolators 404 can include, but are not limited to Pockels cells, Faraday rotators, Faraday isolators, acousto-optic reflectors, or volume Bragg gratings. Pre-amplifier modules 402 could be diode pumped or flash lamp pumped amplifiers and configured in single and/or multipass or cavity type architectures. As will be appreciated, the term pre-amplifier here is used to designate amplifiers which are not limited thermally (i.e. they are smaller) versus power amplifiers 403 (larger). Power amplifiers will typically be positioned to be the final units in a laser system and will be the first modules susceptible to thermal damage, including but not limited to thermal fracture or excessive thermal lensing.

Pre-amplifier modules 402 can include single pass pre-amplifiers usable in systems not overly concerned with energy efficiency. For more energy efficient systems, multipass pre-amplifiers can be configured to extract much of the energy from each pre-amplifier 402 before going to the next stage. The number of pre-amplifiers 402 needed for a particular system is defined by system requirements and the stored energy/gain available in each amplifier module. Multipass pre-amplification can be accomplished through angular multiplexing or polarization switching (e.g. using waveplates or Faraday rotators).

Alternatively, pre-amplifiers 402 can include cavity structures with a regenerative amplifier type configuration. While such cavity structures can limit the maximum pulse length due to typical mechanical considerations (length of cavity), in some embodiments "white cell" cavities can be used. A "white cell" is a multipass cavity architecture in which a small angular deviation is added to each pass. By providing an entrance and exit pathway, such a cavity can be designed to have extremely large number of passes between entrance and exit allowing for large gain and efficient use of the amplifier. One example of a white cell would be a confocal cavity with beams injected slightly off axis and mirrors tilted such that the reflections create a ring pattern on the mirror after many passes. By adjusting the injection and mirror angles the number of passes can be changed.

Power amplifier modules 403 are also used to provide enough stored energy to meet system energy requirements, while supporting sufficient thermal management to enable operation at system required repetition rate whether they are diode or flashlamp pumped.

The spatial and temporal amplitude of the amplified laser beam is difficult to control. Nearly every aspect of the laser amplifier system induces negative effects on the laser beam including: optic aberrations, thermally induced wavefront errors, hardware vibrations, thermal birefringence polarization losses, temperature dependent gain, interference of the laser pulse with itself, amplified reflections from surfaces within the laser, and many others. All of these effects tend to diminish the spatial and/or temporal homogeneity of a propagating beam. In general, laser applications demand uniformity and high brightness. One solution is to try to engineer all of the above aberrations out of the system to achieve a diffraction limited beam which can then be focused to a very small spot or imaged to a delivery location. This is a very difficult problem which typically results in lower efficiency and in the case of imaging still often yields imperfect amplitude control. Another avenue is beam homogenization which is achieved by essentially making many samples of the beam and overlaying them in the nearfield. This method adds divergence to the beam and increases the minimum spot size achievable but yields the benefit of achieving nominal flat top profile beams in both the near field or far field as desired. The difficulty with this method is the presence of laser "speckle" which is essentially the interference peaks and valleys of all the beam samples. This speckle causes problems in the laser system itself as intensity spikes can damage optics, and also results in non-uniform flux at the laser use-point for exposure, cutting, welding, joining, or powder bed fusion additive manufacture.

Several methods for combatting laser "speckle" by "wiggling" the speckle in time including beam deflectors (acousto-optic, electro-optic, mechanical), RF phase modulators, and wavelength division multiplexing. In addition, one can diminish the spatial or temporal coherence of the laser beam itself through the addition of spectral bandwidth, increased angular content, and even by brute force of multiple uncorrelated sources which together can diminish the contrast of the speckle and improve the robustness and effectiveness of the overall laser system.

The thermal management of power amplifiers can include many embodiments both in geometry of the amplifier (rods, slabs, disks), cooling direction (edge cooling, face cooling), and cooling media (solid conduction, liquid, or gas). In one embodiment, fluid cooling of slab amplifier transmission surfaces can provide a scalable method to achieve high average power. One characteristic of the laser systems for printing is the important of uniformity and homogeneity of the laser at the printer image plane. The fluid can be any type that is transparent to the laser wavelength. In the case that the laser wavelength is between 900 and 1100 nm, fluids such as silicone oil, water, distilled water, noble or inert gasses (such as helium), or other gasses such as H2, N2, O2, or CO2, can be used. An added benefit of the gas cooling method is that the turbulent flow of the gas can enhance the homogeneity (reduce the speckle) of the laser beam by causing the "speckle" to move in time thereby improving print performance and protect downstream optics from high peak intensities which could cause laser damage.

Power amplifier modules 403 can be configured in single and/or multi-pass or cavity type architectures. Amplifier modules can include single pass amplifiers usable in systems not overly concerned with energy efficiency. For more energy efficient systems, multipass amplifiers can be configured to extract much of the energy from each amplifier before going to the next stage. The number of amplifiers needed for a particular system is defined by system requirements and the stored energy/gain available in each amplifier module. Multipass pre-amplification can be accomplished through angular multiplexing, polarization switching (waveplates, Faraday rotators).

Alternatively, power amplifiers 403 can include cavity structures with a regenerative amplifier type configuration. As discussed with respect to pre-amplifier modules 402, in some embodiments white cell cavities can be used for power amplification 403.

As will be appreciated, laser flux and energy can be scaled in this architecture by adding more pre-amplifiers and amplifiers with appropriate thermal management and optical isolation.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims. It is also understood that other embodiments of this invention may be practiced in the absence of an element/step not specifically disclosed herein.

The invention claimed is:

1. A system for performing additive manufacturing, the system comprising:
   a powder bed;
   one or more light sources configured to emit a laser beam;
   a light valve configured to apply a pattern to the laser beam; and
   a computerized controller coupled to the one or more light sources and the light valve, the computerized controller configured to:
   perform a preliminary halo test with respect to the one or more light sources;
   perform a calibration step including adjusting at least one of a laser beam energy, pulse width, or area of the one or more light sources in response to a detected area of a halo formed by the preliminary halo test;
   direct the laser beam having a flux greater than 20 kW/cm$^2$ at a defined two-dimensional region of the powder bed; and
   melting and fusing powder within the defined two-dimensional region.

2. The system of claim 1, wherein a computerized controller is further configured to control the one or more light sources such that less than 10% by weight of powder particles in the powder bed are ejected into areas outside the defined two-dimensional region.

3. The system of claim 1, wherein the one or more light sources comprise an arbitrary pulsed laser source, at least one pre-amplifier, and at least one power amplifier.

4. The system of claim 1, wherein a computerized controller is further configured to control the one or more light sources such that the flux is between 20 kW/cm$^2$ and 10 GW/cm$^2$ at the powder bed.

5. The system of claim 1, wherein a computerized controller is further configured to control the one or more light sources such that the defined two-dimensional region of the powder bed is between 0.000025 cm$^2$ and 1,000 cm$^2$.

6. The system of claim 1, wherein a computerized controller is further configured to control the one or more light sources to cause melting and fusing of the powder having a thickness between at least one of a 1-2000 μm range, a 25-250 μm range, and a 50-100 μm range.

7. The system of claim 1, wherein the light valve is a pixel addressable light valve.

8. The system of claim 1, wherein the computerized controller is configured to perform the preliminary halo test by:
   directing the laser beam at a test area on the powder bed; and measuring a plasma-induced halo effect from the laser beam.

9. The system of claim 8, wherein the plasma induced halo effect comprises vapor and particles emitted from the test area.

10. The system of claim 8, further comprising:
a mirror configured to direct a first portion of the laser beam toward the powder bed and permit a second portion of the laser beam to pass through the mirror;
a flux sensor positioned to detect the second portion; and
a vision system targeted at the test area;
wherein the computerized controller is further configured to
receive a laser flux measurement from the flux sensor and receive an image from the vision system; and
modulate at least one of the laser beam energy, the pulse width, or the area of the defined two-dimensional region based on the laser flux measurement and the image.

11. The system of claim 10, further comprising an enclosure containing the powder bed, the computerized controller configured to control supply of an inert gas to the enclosure based on the laser flux measurement and the image.

12. The system of claim 1, further comprising an enclosure configured to contain an inert gas, the powder bed being within the enclosure.

13. The system of claim 12, wherein the enclosure is configured to contain an inert gas above atmospheric pressure around the enclosure.

14. The system of claim 12, wherein the defined two-dimensional region of the powder bed is one of a plurality of two-dimensional regions of the powder bed, the computerized controller configured to sequentially direct the laser beam at the plurality of two-dimensional regions while intermittently increasing and decreasing pressure of the inert gas within the enclosure.

15. The system of claim 14, wherein the computerized controller is configured to increase pressure of the inert gas up to 1000 bar.

16. The system of claim 14, wherein the computerized controller is configured to increase temperature of the inert gas to between 400 and 1500 degrees Celsius.

17. A system for performing additive manufacturing, the system comprising:
a powder bed;
one or more light sources configured to emit a laser beam;
a mirror configured to direct a first portion of the laser beam toward a test area on the powder bed and permit a second portion of the laser beam to pass through the mirror;
a flux sensor positioned to detect the second portion;
a vision system targeted at the test area; and
a computerized controller configured to:
cause the one or more light sources to direct the laser beam at the test area;
receive a laser flux measurement from the flux sensor and receive an image from the vision system; and
modulate at least one of laser beam energy, pulse width, and beam area of the one or more light sources based on the laser flux measurement and the image.

18. The system of claim 17, further comprising an enclosure containing the powder bed, the computerized controller configured to control supply of an inert gas to the enclosure based on the laser flux measurement and the image.

19. The system of claim 18, wherein the computerized controller is configured to increase pressure of the inert gas up to 1000 bar.

20. The system of claim 19, wherein the computerized controller is configured to increase temperature of the inert gas to between 400 and 1500 degrees Celsius.

* * * * *